United States Patent
Suzuki

(10) Patent No.: US 9,247,433 B2
(45) Date of Patent: Jan. 26, 2016

(54) INFORMATION COMMUNICATION APPARATUS

(71) Applicant: Olympus Corporation, Shibuya-ku, Tokyo (JP)

(72) Inventor: Takeshi Suzuki, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/255,173

(22) Filed: Apr. 17, 2014

(65) Prior Publication Data

US 2014/0317764 A1    Oct. 23, 2014

(30) Foreign Application Priority Data

Apr. 19, 2013    (JP) .................. 2013-088725

(51) Int. Cl.
*G06F 7/04*    (2006.01)
*H04W 12/08*    (2009.01)
*H04L 29/06*    (2006.01)

(52) U.S. Cl.
CPC ............. *H04W 12/08* (2013.01); *H04L 63/108* (2013.01)

(58) Field of Classification Search
None
See application file for complete search history.

(56) References Cited

U.S. PATENT DOCUMENTS

2008/0010685 A1\*    1/2008    Holtzman et al. .............. 726/27

FOREIGN PATENT DOCUMENTS

JP    2006-202012    8/2006

\* cited by examiner

*Primary Examiner* — Brandon Hoffman
(74) *Attorney, Agent, or Firm* — John C. Pokotylo; Straub & Pokotylo

(57) ABSTRACT

An information communication apparatus includes: a communication portion; a storage apparatus connection portion that performs input and output operations with respect to a storage apparatus; a storage region management portion configured to provide, in the storage apparatus, a public region that makes an electronic file publicly accessible through the communication portion, and a private region that does not make an electronic file publicly accessible; and a file management portion that is capable of moving an electronic file that is stored in the storage apparatus, and is configured to move a predetermined electronic file to the private region.

7 Claims, 12 Drawing Sheets

INFORMATION COMMUNICATION APPARATUS

CROSS REFERENCE TO RELATED APPLICATION

This application claims the benefit of Japanese Application No. 2013-88725 filed in Japan on Apr. 19, 2013, the contents of which are incorporated herein by this reference.

BACKGROUND OF THE INVENTION

1. Field of the Invention

The present invention relates to an information communication apparatus that is configured to be capable of making electronic files publicly accessible on a network line.

2. Description of the Related Art

Information communication apparatuses are available that are configured to be connectable to a network line such as a wireless LAN, and to be capable of making an electronic file of an image or a document or the like publicly accessible on the network line to share the electronic file with another external device. This kind of information communication apparatus is disclosed, for example, in Japanese Patent Application Laid-Open Publication No. 2006-202012. According to the information communication apparatus disclosed in Japanese Patent Application Laid-Open Publication No. 2006-202012, it is possible to switch between making an electronic file publicly accessible and making the electronic file private on a network line.

Further, in recent years a function for connecting to a network line has also been added to image pickup apparatuses such as digital cameras, and also to external storage apparatuses such as hard disk drives and flash memory cards, and these apparatuses are capable of functioning as information communication apparatuses.

SUMMARY OF THE INVENTION

An information communication apparatus according to one aspect of the present invention includes: a communication portion that is capable of communicating with one or a plurality of external devices through one or a plurality of network lines, and is configured to assign different identification information to each of the one or a plurality of network lines; a storage apparatus connection portion that performs input and output operations with respect to one or a plurality of storage apparatuses that are configured to be capable of storing an electronic file; a storage region management portion that is configured to provide, in the storage apparatus, a public region that makes an electronic file publicly accessible with respect to a network line to which predetermined identification information is assigned among the one or a plurality of network lines, and a private region that does not make an electronic file publicly accessible with respect to the network line to which the predetermined identification information is assigned; and a file management portion that is capable of moving an electronic file that is stored in the storage apparatus, and is configured so as to move a predetermined electronic file to the private region.

DETAILED DESCRIPTION OF THE PREFERRED EMBODIMENTS

Figure 1:
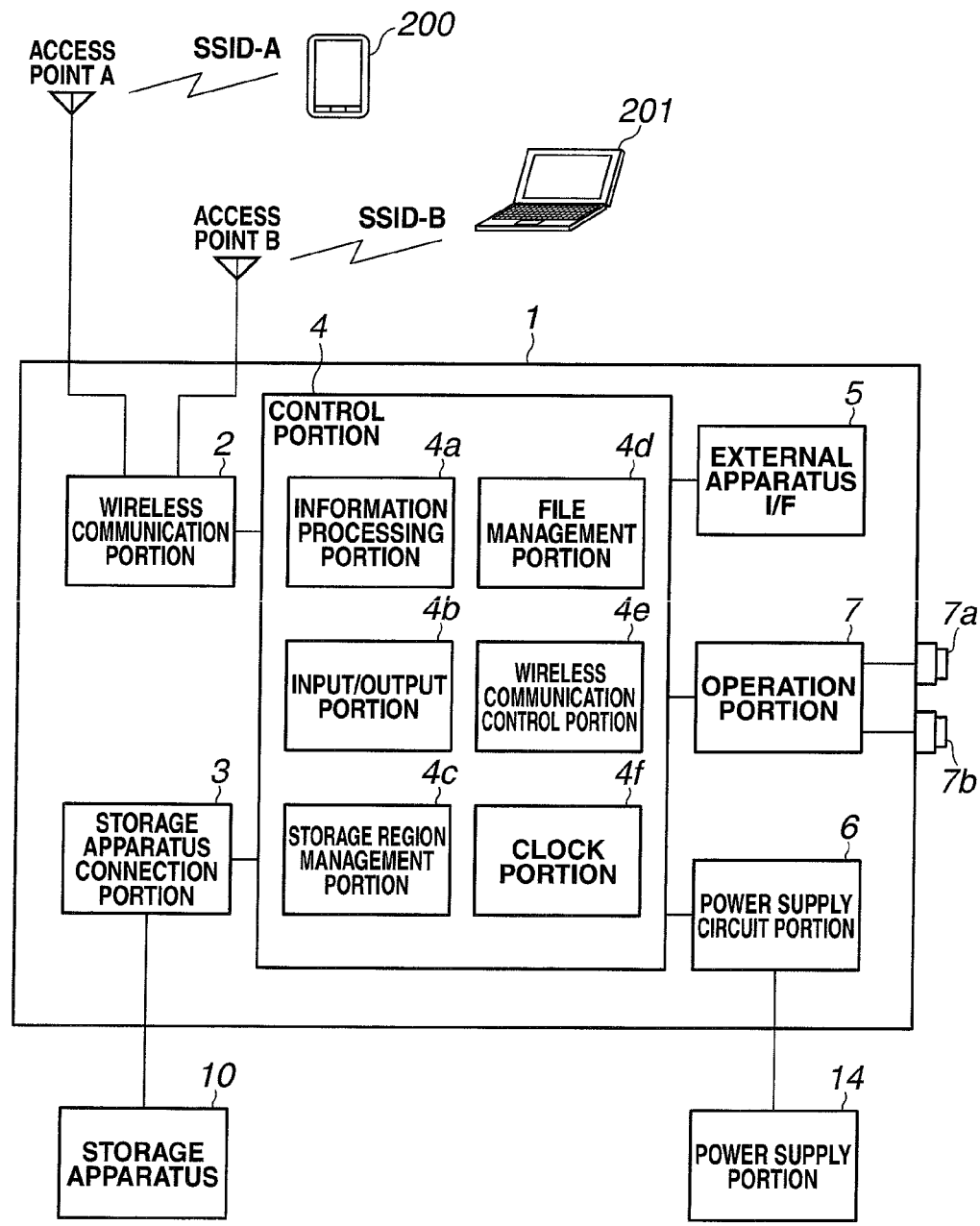
FIG. 1 is a view for describing a configuration of an information communication apparatus according to a first embodiment.

Preferred embodiments of the present invention are described hereunder with reference to the accompanying drawings. It should be noted that the components in the respective drawings used in the following description are each displayed in a different contraction scale so as to be shown in a size that is recognizable in the drawings. Further, the present invention is not limited only to the quantity of components, the shapes of components, the ratios between the sizes of components, and the relative positional relationship between the respective components illustrated in the drawings.

(First Embodiment)

As shown in FIG. 1, an information communication apparatus 1 includes a power supply circuit portion 6, an operation portion 7, a control portion 4, a storage apparatus connection portion 3, an external apparatus interface 5 and a wireless communication portion (communication portion) 2.

The power supply circuit portion 6 is configured to be connectable to a power supply portion 14 that is a battery configured to be capable of supplying electric power or a commercial power source or the like, and so as to supply electric power that is supplied from the power supply portion 14 to respective members constituting the information communication apparatus 1. The power supply portion 14 may be a battery that can be detachably attached to the information communication apparatus 1 or that is built therein, or may be a power output portion of another electronic device that is connected to the information communication apparatus 1. Note that a switch for switching the power supply of the information communication apparatus 1 on and off may also be provided in the power supply circuit portion 6.

The control portion 4 is configured to include an arithmetic apparatus (CPU), a storage apparatus (RAM), an auxiliary storage apparatus, an input/output apparatus and the like, and has a configuration that controls the operations of the information communication apparatus 1 based on a predetermined program. The detailed configuration of the control portion 4 is described later.

The storage apparatus connection portion 3 is configured to be electrically connectable to a storage apparatus 10 that is configured to be capable of storing electronic files (hereunder, referred to as simply "files") that are electronic data such as image data, audio data and text data. The storage apparatus connection portion 3 is configured to be capable of controlling operations of the storage apparatus 10. The storage apparatus 10 is, for example, a flash memory or a hard disk drive. The storage apparatus connection portion 3 may have a form such that a plurality of storage apparatuses 10 can be connected thereto at the same time. The storage apparatus 10 may be detachably attachable to the information communication apparatus 1, or may be fixed inside the information communication apparatus 1.

The information communication apparatus 1 is capable of performing operations to write, read, change, delete, and retrieve files to, from, or in the storage apparatus 10 using a file system of a predetermined format through the storage apparatus connection portion 3.

The external apparatus interface 5 is configured to be capable of communication of electronic data with another electronic device, electronic circuit or electronic component that is an external apparatus by means of wired or wireless communication means configured according to a predetermined communication format.

The communication format of the external apparatus interface 5 is not particularly limited, and may be a serial communication format or a parallel communication format. The external apparatus interface 5 may be a dedicated interface that is provided in correspondence with a specific electronic device, electronic circuit or electronic component, or may be a general purpose interface such as a USB (universal serial bus) or Bluetooth (registered trademark).

In the information communication apparatus 1, electronic data inputted from an external apparatus can be inputted through the external apparatus interface 5 into the control portion 4 or stored in the storage apparatus 10. Conversely, in the information communication apparatus 1, electronic data outputted from the control portion 4 or stored in the storage apparatus 10 can be outputted to an external apparatus through the external apparatus interface 5.

The wireless communication portion 2 is configured to be capable of communication of electronic data with an external device that is another electronic device that is different to the information communication apparatus 1 by wired communication means or wireless communication means configured according to a predetermined format. The wireless communication portion 2 is capable of communication with an external device through a plurality of network lines, and is configured so as to assign identification information to each of the plurality of network lines.

As one example according to the present embodiment, the wireless communication portion 2 is configured to be capable of performing wireless communication with an external device by means of a wireless LAN based on a known standard such as IEEE 802.11a, IEEE 802.11b, IEEE 802.11g or IEEE 802.15. Hereunder, a network line to which the wireless communication portion 2 connects is referred to as a wireless network.

According to the present embodiment, it is possible for the wireless communication portion 2 to be an access point of a plurality of wireless LANs that are a plurality of wireless networks. A different SSID (service set identification) is assigned as identification information to each of the plurality of wireless LAN access points.

Specifically, according to the present embodiment, the wireless communication portion 2 is configured to be capable of serving as a wireless LAN access point A for which the SSID is "SSID-A" and a wireless LAN access point B for which the SSID is "SSID-B". Hereunder, the wireless LAN for which the SSID is "SSID-A" is referred to as "wireless network A" and the wireless LAN for which the SSID is "SSID-B" is referred to as "wireless network B". Note that the status of the SSID-A and SSID-B may be a so-called "broadcasting status" in which the SSID-A and SSID-B are known to devices in the surrounding area or a so-called "stealth status" in which the SSID-A and SSID-B are not notified to devices in the surrounding area.

In this case, the wireless network A and wireless network B may be encrypted networks or may be unencrypted networks. As one example according to the present embodiment, the wireless network A is not encrypted, and is set so that an arbitrary external device can join the network without requiring authentication. In contrast, the wireless network B is encrypted based on a known protocol, and is set so that an external device cannot join the network without inputting a predetermined pass phrase.

Note that an SSID of the wireless network for which the wireless communication portion 2 serves as an access point, a setting regarding whether or not the wireless network is encrypted, and a pass phrase may be fixed or may be changeable by a user.

The operation portion 7 is a component that allows a user to input an operation instruction with respect to the information communication apparatus 1. The operation portion 7 is constituted by, for example, a push button switch, a slide switch, a dial switch or a touch sensor. According to the present embodiment, the operation portion 7 includes a power supply operation switch 7a for switching the power supply of the information communication apparatus 1 on and off, and a wireless communication switching switch 7b for switching between an operating state and a non-operating state of the wireless communication portion 2.

Note that a configuration may also be adopted in which a part or all of the operation portion 7 is realized by a so-called GUI (graphical user interface) that allows a user to input an instruction to the information communication apparatus 1 by selecting an item on a menu displayed as icons or text that is displayed on an image display apparatus. For example, the wireless communication switching switch 7b may be of form such that selection or non-selection of an icon displayed on the image display apparatus is associated with whether or not the wireless communication portion 2 operates. Note that the operation portion 7 may be detachably attachable to the information communication apparatus 1.

Next, the control portion 4 will be described in detail, and operations of the information communication apparatus 1 that is controlled by the control portion 4 will also be described. The control portion 4 is configured to include an input/output portion 4b, a storage region management portion 4c, a file management portion 4d, a wireless communication management portion 4e, a clock portion 4f and an information processing portion 4a.

The input/output portion 4b is a part that controls communication between the control portion 4 and each portion of the information communication apparatus 1.

The storage region management portion 4c is configured to provide a public region RO and a private region RC in the storage apparatus 10 that is connected to the storage apparatus connection portion 3.

The public region RO includes one or a plurality of regions that are capable of storing an arbitrary number of files. The private region RC includes one or a plurality of regions that are capable of storing an arbitrary number of files and that are different to the regions of the public region RO.

In this case, a form for differentiating between the public region RO and the private region RC is not particularly limited. For example, a form may be adopted in which the public region RO and the private region RC are different directories (folders) to each other in a file system constituted by the storage apparatus 10, and in which the public region RO and the private region RC include a plurality of regions that are logically different. In addition, for example, a form may be adopted in which the public region RO and the private region RC include a plurality of partitions obtained by logically dividing the same storage region of the storage apparatus 10. Further, a form may be adopted in which the public region RO and the private region RC are regions that are provided in a plurality of storage apparatuses 10, respectively, with the plurality of storage apparatuses 10 being physically different to each other and connected to the storage apparatus connection portion 3. Furthermore, for example, a form may be adopted in which the public region RO and the private region RC are apparent regions that are constituted by a set of files that are allocated based on metadata values.

Figure 2:
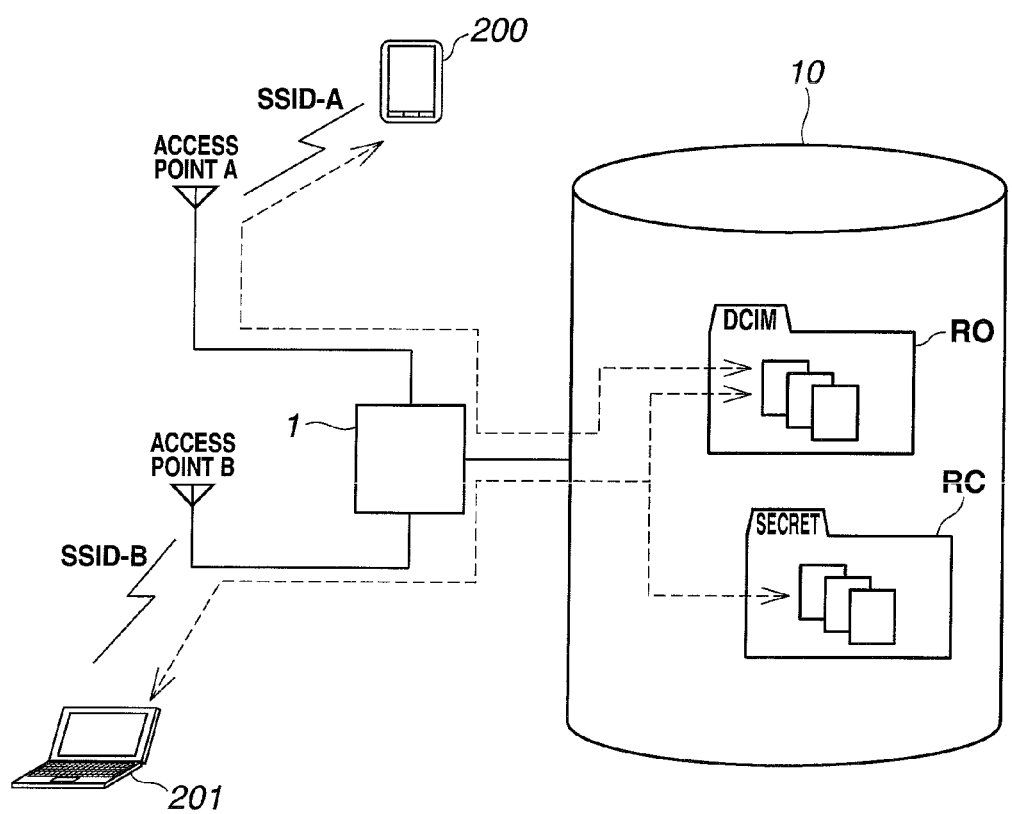
FIG. 2 is a schematic view for describing a public region and a private region.

As one example according to the present embodiment, as shown in FIG. 2, a single storage apparatus 10 is connected to the storage apparatus connection portion 3, and the public region RO and private region RC are two different directories that are provided in a storage region of the storage apparatus 10. According to the present embodiment that is shown in FIG. 2, the directory name of the public region RO is "DCIM", and the directory name of the private region RC is "SECRET".

The storage region management portion 4c is configured to be capable of making a file stored in the storage apparatus 10 that is connected to the storage apparatus connection portion 3 publicly accessible depending on a predetermined condition on the wireless network for which the wireless communication portion 2 serves as an access point. In other words, the storage region management portion 4c is configured to be capable of controlling whether or not access is allowed to a file stored in the storage apparatus 10 from an external device connected thereto through the wireless communication portion 2. That is, the storage region management portion 4c has a function as a file server.

Specifically, the storage region management portion 4c is configured to make files stored in the public region RO publicly accessible on a wireless network to which predetermined first identification information has been assigned, and not to make files stored in the private region RC publicly accessible on the wireless network to which the first identification information has been assigned. Here, the term "first identification information" refers to the SSID that is "SSID-A" according to the present embodiment.

Therefore, according to the present embodiment, the storage region management portion 4c operates so as to make only files stored in the public region RO publicly accessible on the wireless network A whose SSID is "SSID-A", and so as not to make files stored in the private region RC publicly accessible on the wireless network A. That is, although it is possible for an external device 200 that joins the wireless network A to access files stored in the public region RO, the external device 200 cannot access files stored in the private region RC.

As described above, according to the information communication apparatus 1 of the present embodiment, for example, a user can store files in the public region RO of the storage apparatus 10, and by actuating the wireless communication portion 2 and the storage region management portion 4c, can make the files accessible to the external device 200 located in the surrounding area through the wireless network A. In this case, as described above, because the wireless network A is not encrypted and the external device can freely join the wireless network A without requiring authentication, if the wireless communication portion 2 and the storage region management portion 4c are operating, the external device 200 can freely access files stored in the public region RO.

Further, according to the present embodiment, the storage region management portion 4c is configured to be capable of making files stored in the public region RO and the private region RC publicly accessible on a wireless network to which second identification information that is different to the first identification information has been assigned. Here, the term "second identification information" refers to the SSID that is "SSID-B" according to the present embodiment.

Therefore, according to the present embodiment, the storage region management portion 4c operates so as to make files stored in the public region RO and the private region RC publicly accessible on the wireless network B whose SSID is "SSID-B". That is, it is possible for an external device 201 that joins the wireless network B to access files stored in both the public region RO and the private region RC.

As described in the foregoing, the wireless network B is encrypted, and is set so that it is not possible to join the wireless network B without inputting a predetermined pass phrase. Therefore, in the information communication apparatus 1 of the present embodiment, among the files stored in the storage apparatus 10, it is possible to make files that are stored in the private region RC that cannot be accessed from the external device 200 publicly accessible to the specific external device 201 that was authenticated.

Figure 3:
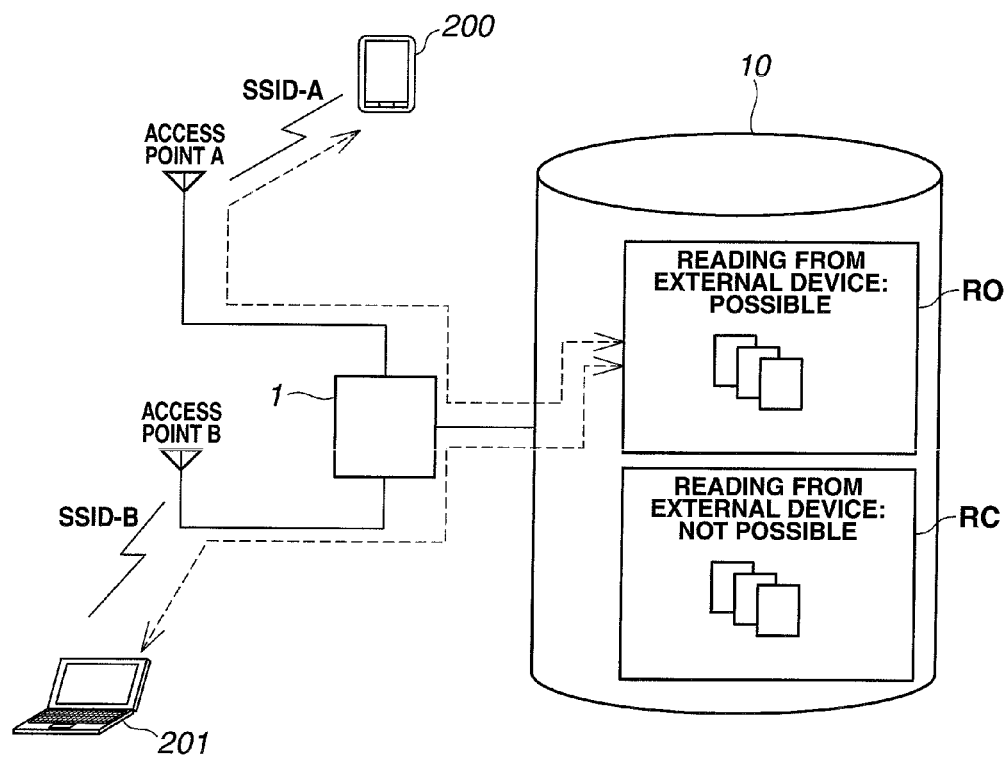
FIG. 3 is a schematic view for describing a modification of the public region and the private region.

Note that, although according to the present embodiment a configuration is adopted in which the public region RO and the private region RC are the "DCIM" directory and the "SECRET" directory, respectively, the form employed to separate the public region RO and the private region RC is, as described above, not limited to a form in which the directories are different. For example, as shown in FIG. 3, a form may also be adopted in which, on a file system or on an interface that is used when accessing the information communication apparatus 1 from an external device, an apparent region that is a set of files that can be read from an external device is set as the public region RO, and an apparent region that is a set of files that cannot be read from an external device is set as the private region RC. In the example illustrated in FIG. 3, the public region RO is configured to include files to which metadata to the effect that reading from an external device is possible is attached, and the private region RC is configured to include files to which metadata to the effect that reading from an external device is not possible is attached.

The file management portion 4d is configured to be capable of performing operations such as creating, changing, deleting, and moving directories or files in the storage region of the storage apparatus 10. The file management portion 4d is also configured to be capable of rewriting metadata that is attached to a file.

The wireless communication management portion 4e is configured to be capable of controlling operations of the wireless communication portion 2. The wireless communication management portion 4e performs control to switch between a state in which power is supplied to the wireless communication portion 2 and a state in which power is not supplied thereto, and to switch between a state in which the wireless communication portion 2 operates as an access point and a state in which the wireless communication portion 2 does not operate as an access point.

The clock portion 4f is configured to generate time period information that the control portion 4 uses. According to the present embodiment, counts such as Ton and Toff that are timer variables used inside the control portion 4 are used as time period information of the clock portion 4f.

The information processing portion 4a is configured to control operations of each part of the information communication apparatus 1 in accordance with a predetermined program.

Figure 4:
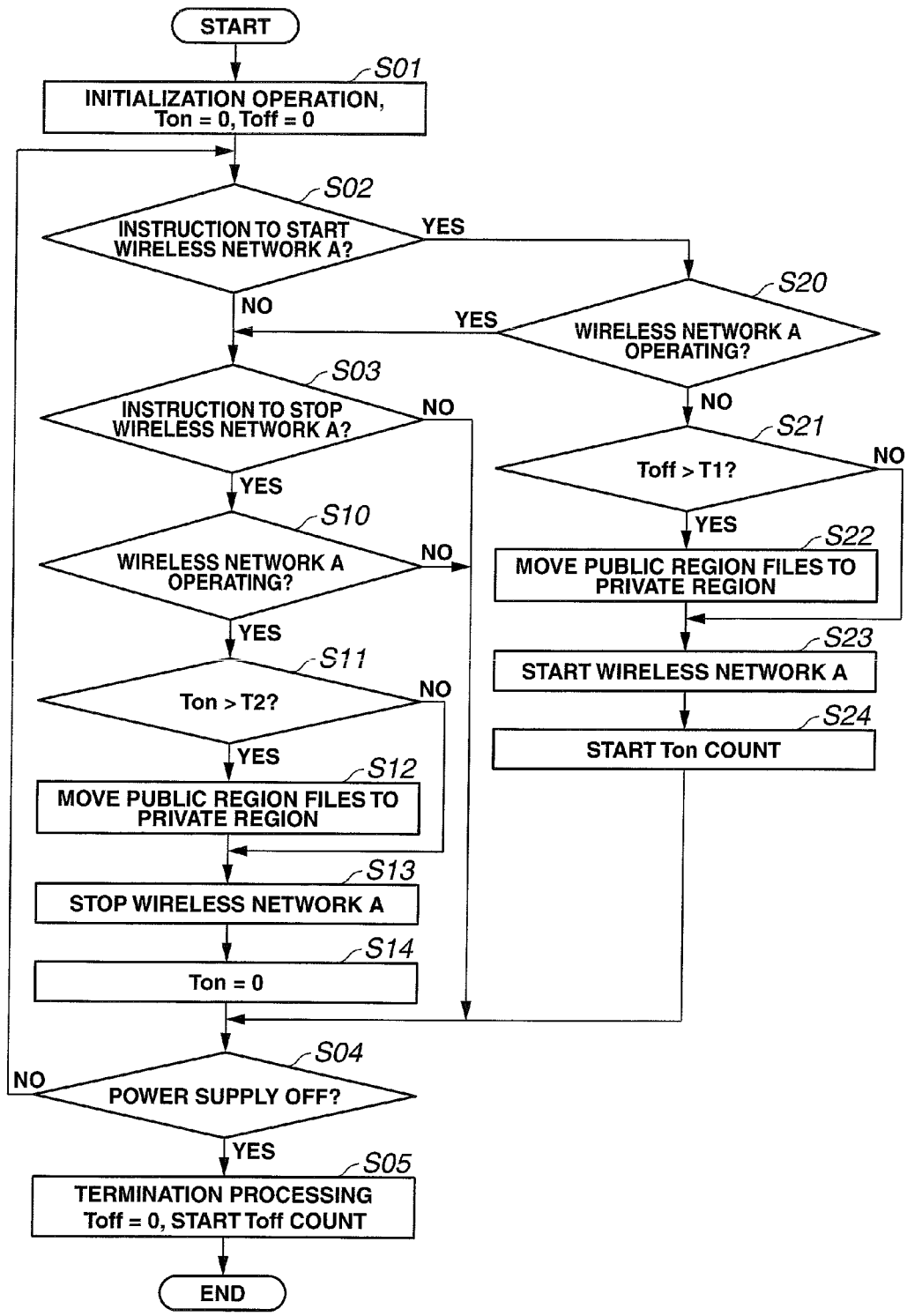
FIG. 4 is a flowchart illustrating operations of the information communication apparatus according to the first embodiment.

The processing illustrated in FIG. 4 is started when the supply of power from the power supply portion 14 to the information communication apparatus 1 is started. As one example according to the present embodiment, the supply of power from the power supply portion 14 to the information communication apparatus 1 is started when the power supply operation switch 7a is operated by a user.

First, in step S01, an initialization operation that is required to activate the parts constituting the information communication apparatus 1 is executed. Further, in step S01, a value of the timer Ton that counts an elapsed time period is reset to 0. According to the present embodiment, it is assumed that, in a state in which the initialization operation in step S01 has ended, the supply of power to the wireless communication portion 2 is stopped.

Next, in step S02, it is determined whether or not an instruction to start operation of the wireless communication portion 2 was inputted. Note that a form of inputting an instruction to start operation of the wireless communication portion 2 may be a so-called "manual" form in which a user operates the wireless communication switching switch 7b, or may be a form in which the control portion 4 automatically generates an instruction to start operation of the wireless communication portion 2 when the control portion 4 determines that a predetermined condition is satisfied.

For example, a form may be adopted in which the control portion 4 always generates an instruction to start operation of the wireless communication portion 2 after the initialization operation in step S01 ends, or in which the control portion 4 generates an instruction to start operation of the wireless communication portion 2 when a predetermined signal is inputted through the external apparatus interface 5.

As one example according to the present embodiment, it is assumed that an instruction to start operation of the wireless communication portion 2 is inputted when the wireless communication switching switch 7b is operated by a user. Note that, since a configuration is adopted according to the present embodiment so that the wireless network A and the wireless network B are started when the wireless communication portion 2 starts to operate, step S02 can be described in another way as a step of determining whether or not an instruction to start the wireless network A was inputted.

If it is determined in step S02 that an instruction to start operation of the wireless communication portion 2 has not been inputted, the process transitions to step S03. In step S03, it is determined whether or not an instruction to stop the wireless communication portion 2 was inputted. That is, in step S03, it is determined whether or not an instruction to stop the wireless network A was inputted. As one example according to the present embodiment, an instruction to stop the wireless communication portion 2 is inputted when the user operates the wireless communication switching switch 7b.

Note that a configuration may also be adopted in which the control portion 4 automatically generates an instruction that is inputted to stop the wireless communication portion 2 in a case where the control portion 4 determines that a predetermined condition was satisfied. For example, a configuration may be adopted in which the control portion 4 generates an instruction to switch off the power supply of the information communication apparatus 1 when a predetermined signal was inputted through the external apparatus interface 5.

In step S03, if it is determined that an instruction to stop the wireless communication portion 2 has not been inputted, the process transitions to step S04. In step S04, it is determined whether or not an instruction to turn off the power supply of the information communication apparatus 1 was inputted. As one example according to the present embodiment, an instruction to turn off the power supply of the information communication apparatus 1 is inputted as a result of the user operating the power supply operation switch 7a.

Note that a configuration may also be adopted in which the control portion 4 automatically generates an instruction to turn off the power supply of the information communication apparatus 1 in a case where the control portion 4 determines that a predetermined condition was satisfied. For example, a configuration may be adopted in which the control portion 4 generates an instruction to switch off the power supply of the information communication apparatus 1 when a predetermined signal was inputted through the external apparatus interface 5.

In step S04, if it is determined that an instruction to turn off the power supply of the information communication apparatus 1 has not been inputted, the process returns to step S02. That is, the above described steps S02, S03 and S04 are steps in which the control portion 4 stands by until an instruction to operate or stop the wireless communication portion 2 or an instruction to turn off the power supply is inputted.

If it is determined that an instruction to turn off the power supply of the information communication apparatus 1 was inputted (Yes in step S04), the process transitions to step S05. In step S05, termination processing to turn off the power supply of the information communication apparatus 1 is executed. Further, in the termination processing in step S05, the value of the timer Toff that counts the elapsed time period is reset to 0, and thereafter the count of the timer Toff is started.

On the other hand, if it is determined that an instruction to start operation of the wireless communication portion 2 was inputted (Yes in step S02), the process transitions to step S20. In step S20, it is determined whether or not the wireless communication portion 2 is already operating. If it is determined in step S20 that the wireless communication portion 2 is in an operating state, that is, the wireless network A is in an operating state, the process returns to step S03.

In step S20, if it is determined that the wireless communication portion 2 is in a stopped state, that is, the wireless network A is in a stopped state, the process transitions to step S21. In step S21, it is determined whether or not the value of the timer Toff exceeds a predetermined value T1. As described above with respect to step S05, the timer Toff is a timer at which a count is started at the time of termination processing of the information communication apparatus 1. Accordingly, the value of the timer Toff represents an elapsed time period from the time point at which the information communication apparatus 1 last entered a power-off state until the current time point.

If it is determined in step S21 that the value of the timer Toff exceeds T1, the process transitions to step S22. In contrast, if it is determined in step S21 that the value of the timer Toff does not exceed T1, the process skips step S22 and transitions to step S23.

That is, step S22 is executed in a case where a time period from a time point at which the information communication apparatus 1 last entered a power-off state until the time point at which the instruction to start the wireless network A was inputted exceeds the predetermined value T1.

In step S22, all of the files that are stored in the public region RO of the storage apparatus 10 are moved to the private region RC. Note that the value of T1 may be a fixed value or may be a value that can be changed by a user. As one example according to the present embodiment, it is assumed that T1 is 300 minutes.

In step S23, operation of the wireless communication portion 2 is started to thereby start the wireless network A and the wireless network B. Thereafter, in step S24, the count of the timer Ton is started. After step S24, the process transitions to step S04, and as described above, in steps S02, S03 and S04 the control portion 4 stands by until an instruction to operate or stop the wireless communication portion 2 or an instruction to turn off the power supply is inputted.

Next, a case will be described in which it is determined in step S03 that an instruction to stop the wireless communication portion 2 was inputted. In this case, the process transitions to step S10. In step S10, it is determined whether or not the wireless communication portion 2 is operating. If it is determined in step S10 that the wireless communication portion 2 is in a stopped state, that is, the wireless network A is in a stopped state, the process transitions to step S04.

In contrast, in step S10, if it is determined that the wireless communication portion 2 is in an operating state, that is, the wireless network A is operating, the process transitions to step S11. In step S11, it is determined whether or not the value of the timer Ton exceeds a predetermined value T2. The timer Ton is a timer at which a count is started at a time point at which the wireless communication portion 2 starts operation, as indicated in the above described step S24. Accordingly, the value of the timer Ton represents an elapsed time period from a time point at which the wireless communication portion 2 that is currently in an operating state started operating until the current time point.

If it is determined in step S11 that the value of the timer Ton exceeds T2, the process transitions to step S12. In contrast, if it is determined in step S11 that the value of the timer Ton does not exceed T2, the process skips step S12 and transitions to step S13.

That is, step S12 is executed in a case where an operating time period of the wireless network A that is currently operating exceeds the predetermined value T2.

In step S12, all of the files that are stored in the public region RO of the storage apparatus 10 are moved to the private region RC. Note that the value of T2 may be a fixed value or may be a value that can be changed by a user. As one example according to the present embodiment, it is assumed that T2 is 300 minutes.

In step S13, the operation of the wireless communication portion 2 is stopped. That is, the wireless network A and the wireless network B are stopped. Thereafter, in step S14, the value of the timer Ton is reset to 0. After step S14, the process transitions to step S04, and as described above, in steps S02, S03 and S04 the control portion 4 stands by until an instruction to operate or stop the wireless communication portion 2 or an instruction to turn off the power supply is inputted.

As described above, the information communication apparatus 1 of the present embodiment is configured to include: the wireless communication portion 2 that is configured to be capable of communicating with an external device through the wireless network A to which the identification information referred to as SSID-A is assigned and the wireless network B to which the identification information referred to as SSID-B is assigned; the storage apparatus connection portion 3 that performs input and output operations with respect to the storage apparatus 10; and the control portion 4.

The control portion 4 is configured to include: the storage region management portion 4c that is configured to provide, in the storage apparatus 10, the public region RO that makes a file publicly accessible on the wireless network A and the private region RC that does not make a file publicly accessible on the wireless network A; and the file management portion 4d that is configured to be capable of moving files that are stored in the storage apparatus 10.

Further, the file management portion 4d is configured to move all files that are stored in the public region RO to the private region RC in at least one of a case where, at the time of starting the wireless network A, a predetermined time period Ti has elapsed since the previous time that the wireless network A stopped (Yes in step S21) and a case where the operating time period of the wireless network A at the time of stopping the wireless network A exceeds a predetermined time period T2 (Yes in step S11).

According to the information communication apparatus 1 of the present embodiment that has the above described configuration, it is possible to easily make files that are stored in the public region RO publicly accessible on the wireless network A. In a case such as in the present embodiment in which it is possible to join the wireless network A without requiring authentication, sharing of files can be performed with ease since files that are stored in the public region RO are accessible to an external device that can connect to a wireless LAN that is present in an area around the information communication apparatus 1.

Further, according to the present embodiment, files stored in the public region RO are moved to the private region RC in a case where, at the time of starting the wireless network A, a predetermined time period T1=300 minutes has elapsed since the previous time the wireless network A stopped. That is, the information communication apparatus 1 is configured so as not to make files publicly accessible on the wireless network A when the user starts the wireless network A in a case where a time period since the previous time that use of the information communication apparatus 1 ended exceeds a relatively long time period (as one example, 300 minutes).

For example, in a case where a user uses an apparatus that can make a file publicly accessible on a wireless network that can be joined without requiring authentication, and the user then forgets to delete the relevant file after using the apparatus, there is a risk that at a different time or a different place thereafter, a state may be entered in which the relevant file can be freely accessed by a third party against the intention of the user.

With respect to this problem, according to the information communication apparatus 1 of the present embodiment, even if the user forgot to delete a file from the public region RO the previous time that the user used the information communication apparatus 1, if the user uses the information communication apparatus 1 again after a predetermined time period has elapsed since the previous time of use, the relevant file is not made publicly available on the wireless network A against the intention of the user.

Furthermore, according to the present embodiment, in a case where the operating time period of the wireless network A when stopping the wireless network A exceeds the predetermined time period T2 also, files that are stored in the public region RO are moved to the private region RC. That is, a file that is publicly accessible on the wireless network A for a time period that exceeds the predetermined time period T2 is automatically moved to the private region RC. Consequently, according to the information communication apparatus 1 of the present embodiment, even if the user forgot to delete a file from the public region RO, the relevant file is not made publicly accessible on the wireless network A against the intention of the user. In addition, although there is a possibility that a user may mistakenly delete a file which the user did not originally intend to delete in a case where the user manually deletes files stored in the public region RO, according to the present embodiment, since the files are only moved to the private region RC, the loss of a file that is caused by an erroneous operation can be prevented.

As described above, the information communication apparatus 1 of the present embodiment can prevent a file being made publicly accessible on a wireless network against the intention of the user.

The information communication apparatus 1 of the present embodiment is applicable to various kinds of electronic devices that handle files. For example, the information communication apparatus 1 is applicable to a flash memory card equipped with a wireless LAN function as well as a portable communication terminal that is capable of connecting to a wireless LAN.

The information communication apparatus 1 is also applicable to an image pickup apparatus of a form that is generally referred to as an "electronic camera" or a "digital camera" or the like. Hereunder, an example in which the information communication apparatus 1 is applied to an image pickup apparatus 100 is described referring to FIG. 5.

The image pickup apparatus 100 is configured to pick up an image that is at least one of a still image and a movie with an image pickup portion 11 having an image sensor such as a CCD or a CMOS sensor, and to store the still image or movie as a file in a storage apparatus 10. The storage apparatus 10 is, for example, a flash memory, and is made in at least one of a form that is detachably attachable to the image pickup apparatus 100 and a form that is fixed inside the image pickup apparatus 100.

The image pickup portion 11 includes an image pickup lens, an image sensor and an image processing portion and the like, and is configured to be capable of converting an optical image that is formed by the image pickup lens into image data. Note that the image pickup portion 11 may also include at least one of a microphone and a microphone connection portion, and be configured to be capable of generating audio data. The image pickup portion 11 may also be of a form that is detachably attachable to the image pickup apparatus 100. Since a configuration for implementing image pickup operations of the image pickup apparatus 100 is known, a detailed description thereof is omitted herein.

As one example according to the present embodiment, the information communication apparatus 1 is incorporated into the configuration of the image pickup apparatus 100 as one portion thereof. A part or all of the configuration of the information communication apparatus 1 that is described above is arranged so as to also serve as a configuration required for operations of the image pickup apparatus 1.

Specifically, according to the present embodiment, a control portion 4 of the information communication apparatus 1 has a function for controlling operations of each portion of the image pickup apparatus 100. That is, a function of the control portion 4 of the information communication apparatus 1 is implemented in a software form, a middleware form or a hardware form at a control portion of the image pickup apparatus 100.

An external apparatus interface 5 functions as an internal bus that electrically connects the control portion 4 and the image pickup portion 11, and also functions as an external bus that connects with an external apparatus that is not illustrated in the drawing. Note that the external apparatus interface 5 may also be capable of connecting through a USB with a personal computer or the like that is an external device.

The image pickup apparatus 100 is capable of writing files to the storage apparatus 10 and reading files that are stored in the storage apparatus 10, through the storage apparatus connection portion 3. Image data picked up by the image pickup portion 11 is stored as a file of a predetermined format in the storage apparatus 10.

An operation portion 7 is constituted by, for example, a push button switch, a dial switch, or a touch sensor to allow a user to input an operation instruction with respect to the image pickup apparatus 100. Specifically, the operation portion 7 includes a release switch for instructing execution of a photographing operation, a power supply operation switch 7a for switching the power supply of the image pickup apparatus 100 on and off, and a wireless communication switching switch 7b for switching between an operating state and a non-operating state of the wireless communication portion 2 and the like. Switching the power supply of the image pickup apparatus 100 on and off by means of the power supply operation switch 7a means that the power supply of the information communication apparatus 1 is switched on and off Note that the operation portion 7 may also be configured to include an acceleration sensor or a gyroscope, and to detect a predetermined change in the posture of the image pickup apparatus 100 as an input of an instruction by the user.

A display portion 13 is configured to include an image display apparatus constituted by a liquid crystal display apparatus or an organic EL display apparatus or the like. Image data that was picked up by the image pickup apparatus 100 and, as necessary, one or a combination of a plurality of menus for setting identification information (SSID) and operating conditions of the image pickup apparatus 100 and the information communication apparatus 1 and the like are displayed on the display portion 13. Note that the display portion 13 may also be configured in a form that does not include an image display apparatus and that displays an operating state of the image pickup apparatus 100 and the information communication apparatus 1 by means of changes in a lighting state of one or a plurality of LEDs. Further, the image pickup apparatus 100 may be configured in a form that does not include the display portion 13.

A power supply circuit portion 6 is configured to be connectable with the power supply portion 14 that is an AC/DC converter connected to a commercial power source or is a battery or the like, and to supply electric power supplied from the power supply portion 14 to each member constituting the image pickup apparatus 100. As one example according to the present embodiment, the power supply portion 14 is a secondary battery and is housed inside the image pickup apparatus 100. Note that the power supply portion 14 may be configured in a form that is fixed inside the image pickup apparatus 100 or may be in a form that is detachably attachable to the image pickup apparatus 100.

According to the image pickup apparatus 100 described above, a file of an image picked up by the image pickup portion 11 is stored in the public region RO of the storage apparatus 10. Accordingly, if the user operates the wireless communication switching switch 7b to input an instruction to start operation of the wireless communication portion 2, as described above, the image file is made publicly accessible on the wireless network A through the information communication apparatus 1. Hence, it is possible to easily share the image file that was picked up by the image pickup apparatus 100 with other external devices at the location where the image was picked up.

In addition, according to the present embodiment, even if the user does not delete the image file from the public region RO, the relevant file is not made public on the wireless network A when the image pickup apparatus 100 is next used if a predetermined time period has elapsed since the previous time of use. For example, if the power supply of the image pickup apparatus 100 is turned off and is left in that state overnight, if the power supply of the image pickup apparatus 100 is turned on the next day, image files that were picked up the previous day are automatically moved to the private region RC before starting the wireless network A.

Further, as described above, when a time period for which files have been made publicly accessible on the wireless network A exceeds the predetermined time period T2, the files are automatically moved to the private region RC.

As described above, according to the image pickup apparatus 100 that includes the information communication apparatus 1 of the present embodiment, it is possible to prevent a file being made publicly accessible on a wireless network against the intention of the user.

In particular, according to the image pickup apparatus 100, unlike in the case of a personal computer, because the size and shape of the operation portion 7 and the display portion 13 are restricted according to the size of the apparatus, operations to move or delete files stored in the storage apparatus 10 are liable to be complicated. That is, according to the conventional image pickup apparatuses, operations to switch between making files publicly accessible on a wireless network and making files not publicly accessible thereon are complicated. Moreover, when the operations are complicated, there is also a risk that files may be made publicly accessible on a wireless network against the intention of the user due to an erroneous operation. However, according to the present embodiment, it is possible to switch between a state in which files are automatically made publicly accessible on a wireless network and a state in which the files are automatically made not publicly accessible on the wireless network.

According to the present embodiment that is described above, the information communication apparatus 1 is configured so that, in both a case where, at a time of starting the wireless network A, the predetermined time period T1 has elapsed since the previous time the wireless network A stopped, and a case where, when stopping the wireless network A, an operating time period of the wireless network A exceeds the predetermined time period T2, the information communication apparatus 1 moves all files that are stored in the public region RO to the private region RC.

However, the information communication apparatus 1 according to the present invention may also be configured to move all the files that are stored in the public region RO to the private region RC in only one of the above described two cases.

Figure 6:
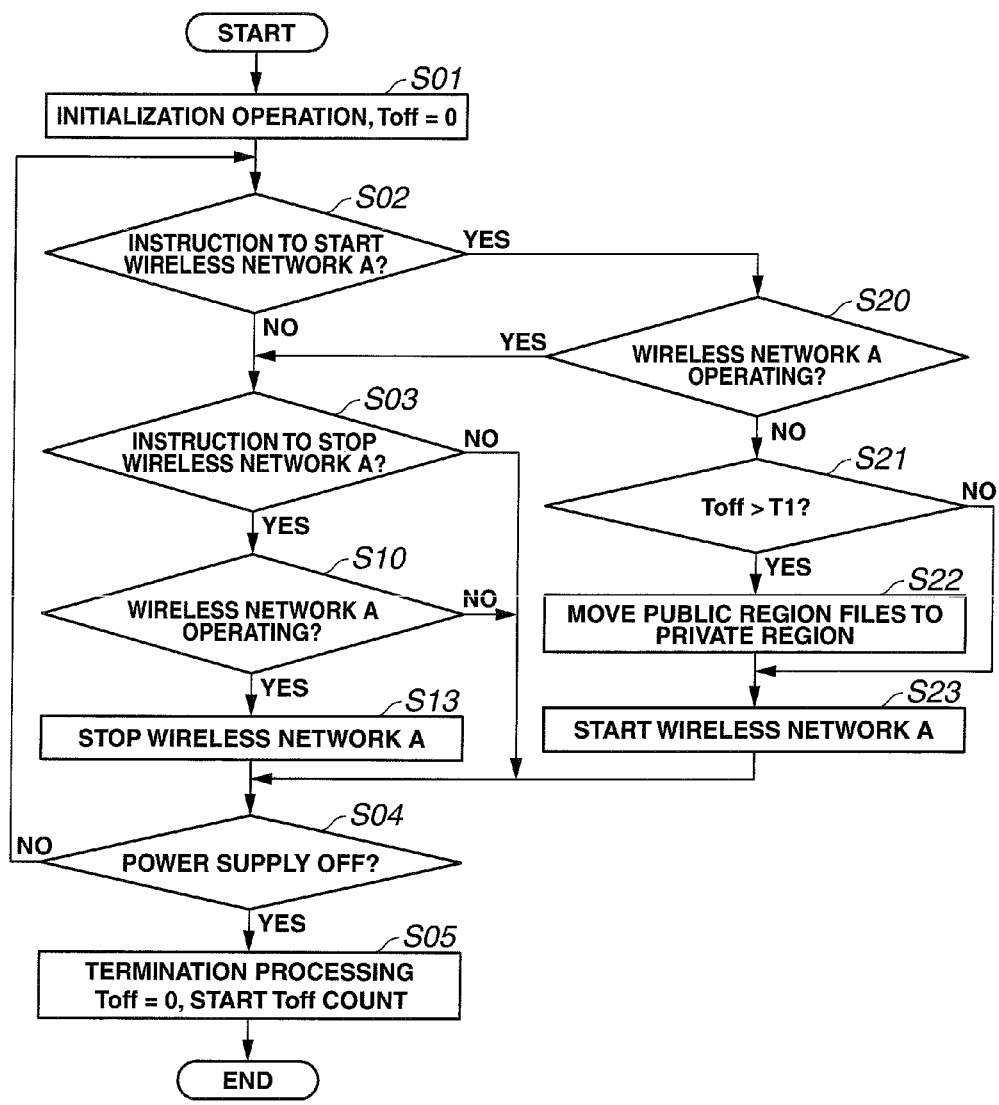
FIG. 6 is a flowchart illustrating a first modification of the first embodiment.

For example, as illustrated as a first modification in FIG. 6, the information communication apparatus 1 may be configured to move all the files stored in the public region RO to the private region RC in a case where, when starting the wireless network A, the predetermined time period T1 has elapsed since the previous time that the wireless network A stopped.

Figure 7:
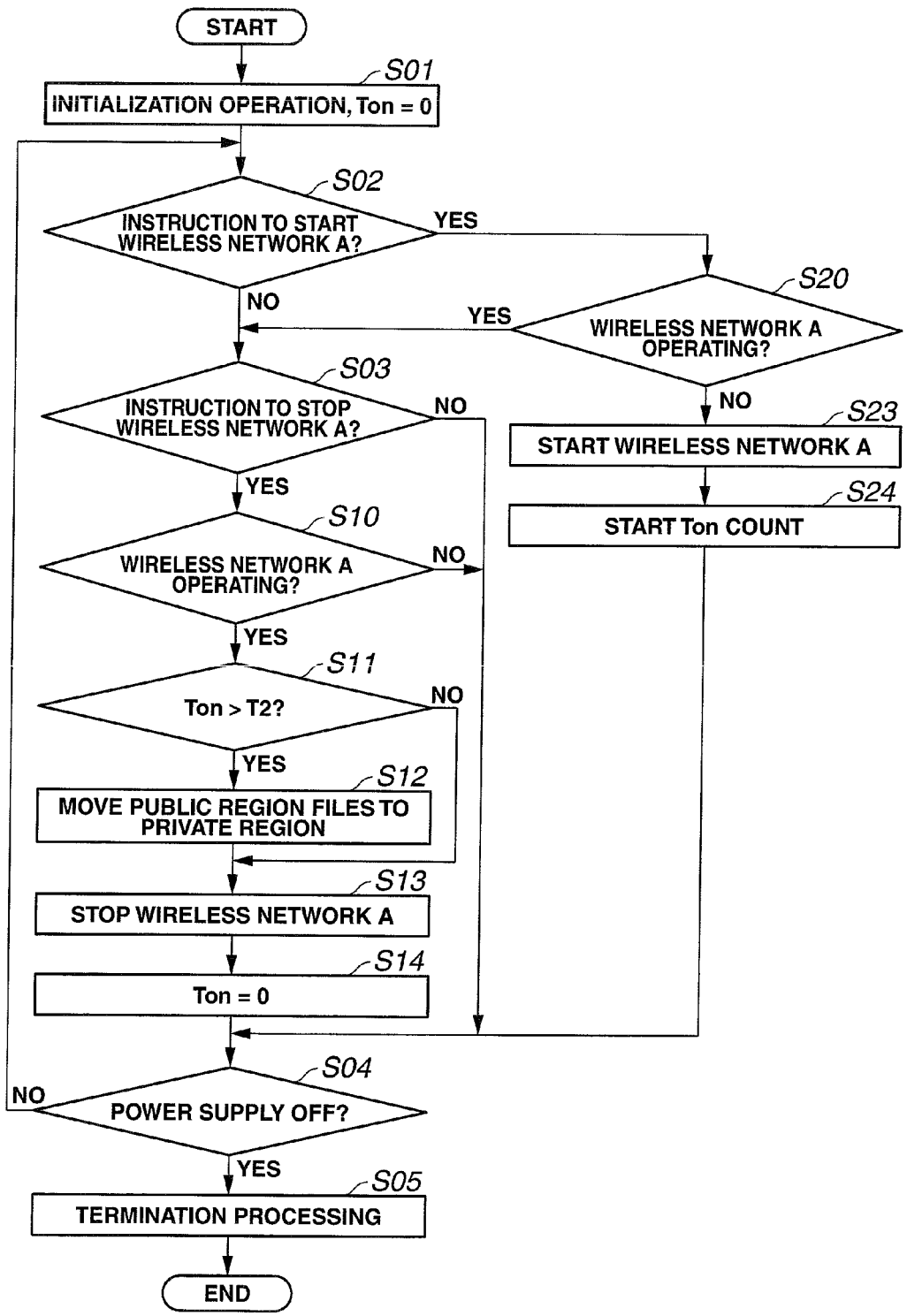
FIG. 7 is a flowchart illustrating a second modification of the first embodiment.

Further, for example, as illustrated as a second modification in FIG. 7, the information communication apparatus 1 may be configured to move all the files stored in the public region RO to the private region RC in a case where, when stopping the wireless network A, the operating time period of the wireless network A exceeds the predetermined time period T2.

According to the above described first and second modifications also, it is possible to prevent files being made publicly accessible on a wireless network against the intention of the user as described above.

(Second Embodiment)

Next, a second embodiment of the present invention will be described. Note that only differences with respect to the first embodiment are described hereunder, and components that are the same as in the first embodiment are denoted by the same reference numerals and a description of such components is omitted as appropriate.

Figure 5:
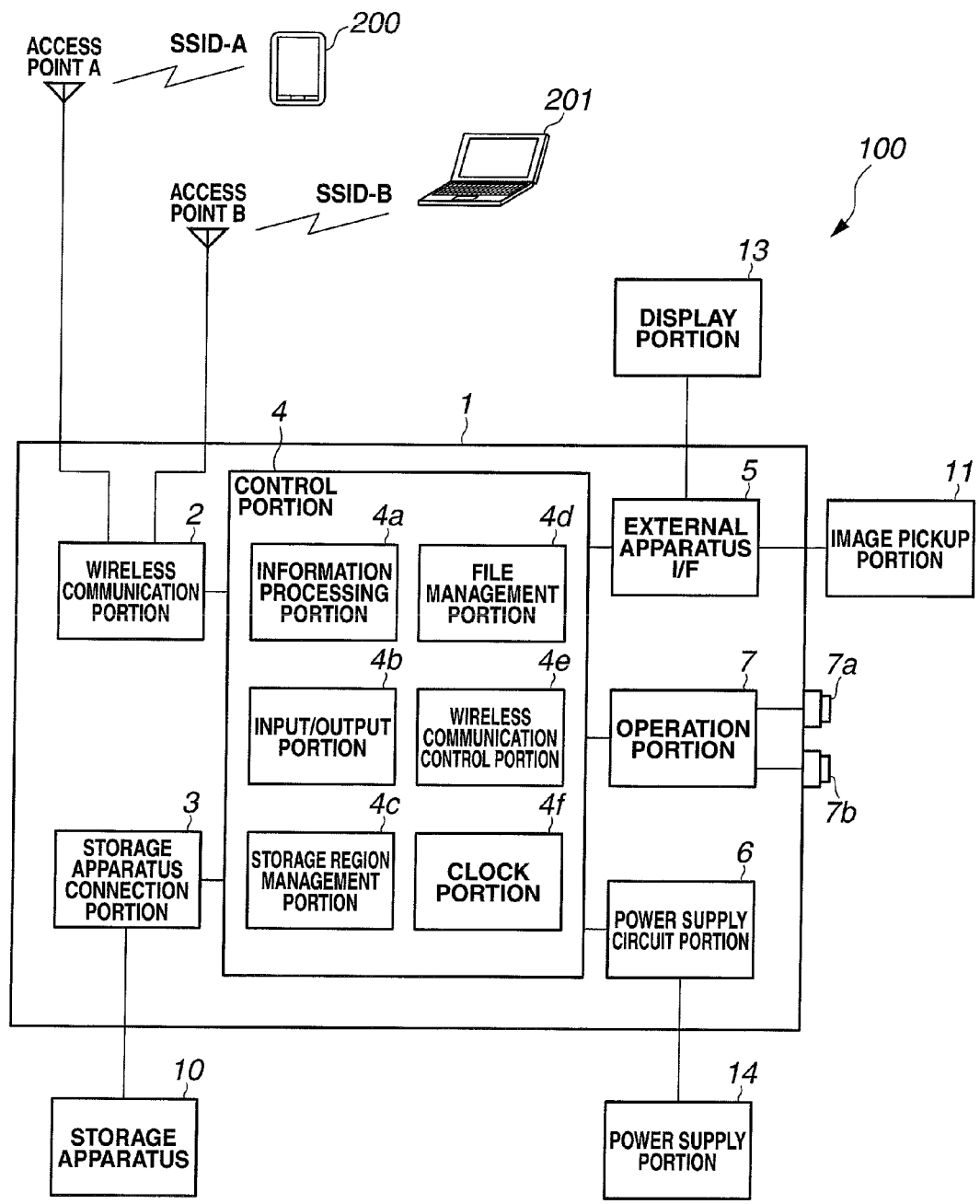
FIG. 5 is a view for describing a configuration of an image pickup apparatus according to the first embodiment.
Figure 8:
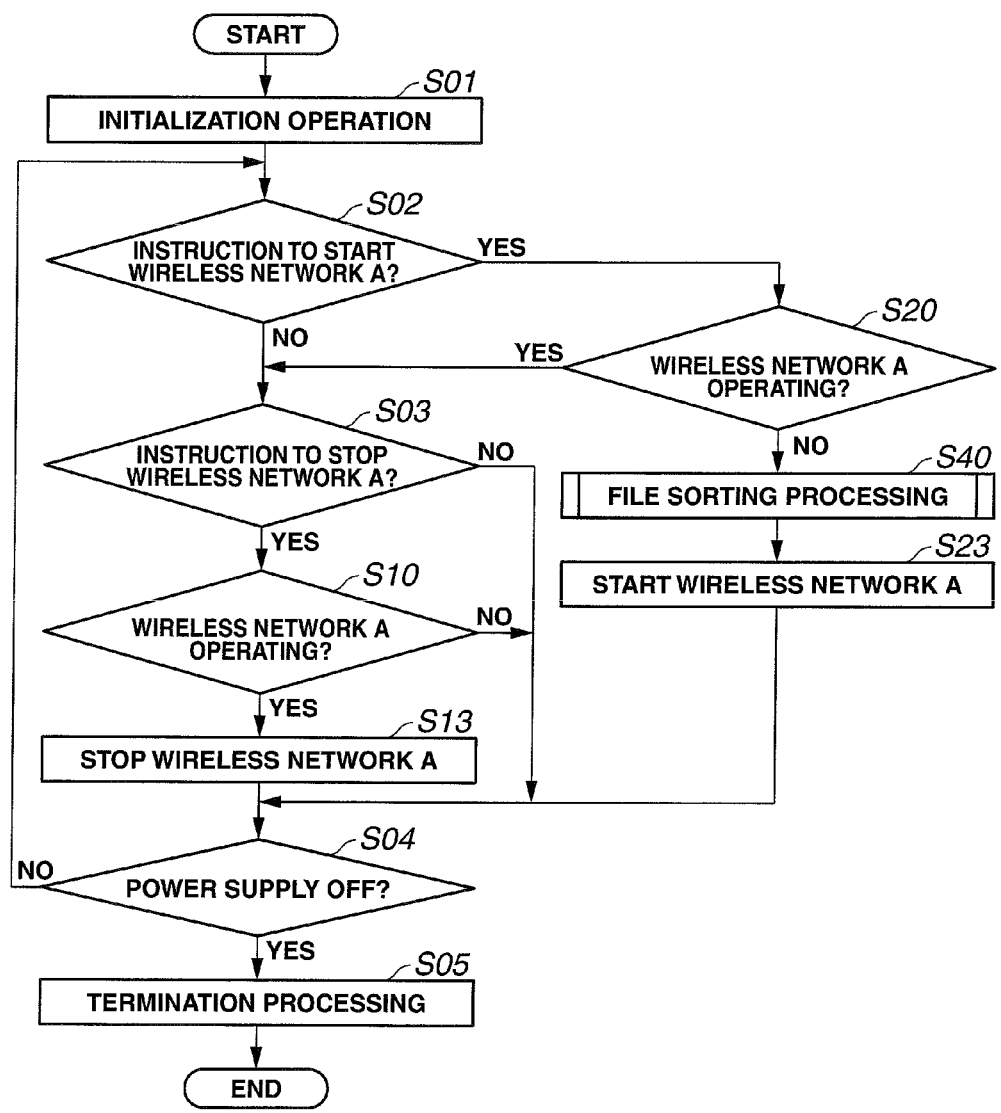
FIG. 8 is a flowchart illustrating operations of an information communication apparatus according to a second embodiment.

The configuration of the information communication apparatus 1 of the present embodiment is the same as in the first embodiment illustrated in FIG. 1 or FIG. 5. Operations of the information communication apparatus 1 of the present embodiment will now be described referring to the flowcharts illustrated in FIG. 8 and FIG. 9.

First, in step S01, an initialization operation that is required to activate the parts constituting the information communication apparatus 1 is executed. According to the present embodiment, it is assumed that, in a state in which the initialization operation in step S01 has ended, the supply of power to the wireless communication portion 2 is stopped. Note that the information communication apparatus 1 may also be configured so that the wireless communication portion 2 starts operation in a state in which the initialization operation has ended.

Next, in step S02, it is determined whether or not an instruction to start operation of the wireless communication portion 2 was inputted. If it is determined in step S02 that an instruction to start operation of the wireless communication portion 2 has not been inputted, the process transitions to step S03.

In step S03, it is determined whether or not an instruction to stop the wireless communication portion 2 was inputted. If it is determined in step S03 that an instruction to stop the wireless communication portion 2 has not been inputted, the process transitions to step S04.

In step S04 it is determined whether or not an instruction to turn off the power supply of the information communication apparatus 1 was inputted.

Similarly to the first embodiment, the above described steps S02, S03 and S04 are steps in which the control portion 4 stands by until an instruction to operate or stop the wireless communication portion 2 or an instruction to turn off the power supply is inputted.

If it is determined that an instruction to turn off the power supply of the information communication apparatus 1 was inputted (Yes in step S04), the process transitions to step S05. In step S05, termination processing to turn off the power supply of the information communication apparatus 1 is executed.

On the other hand, if it is determined that an instruction to stop the wireless communication portion 2 was inputted (Yes in step S03), the process transitions to step S10. In step S10, it is determined whether or not the wireless communication portion 2 is operating. If it is determined in step S10 that the wireless communication portion 2 is in a stopped state, that is, the wireless network A is in a stopped state, the process transitions to step S04. In contrast, in step S10, if it is determined that the wireless communication portion 2 is in an operating state, that is, the wireless network A is operating, the process transitions to step S13. In step S13, operation of the wireless communication portion 2 is stopped.

In contrast, if it is determined that an instruction to start operation of the wireless communication portion 2 was inputted (Yes in step S02), the process transitions to step S20. In step S20, it is determined whether or not the wireless communication portion 2 is already operating. If it is determined in step S20 that the wireless communication portion 2 is in an operating state, that is, the wireless network A is in an operating state, the process returns to step S03.

Figure 9:
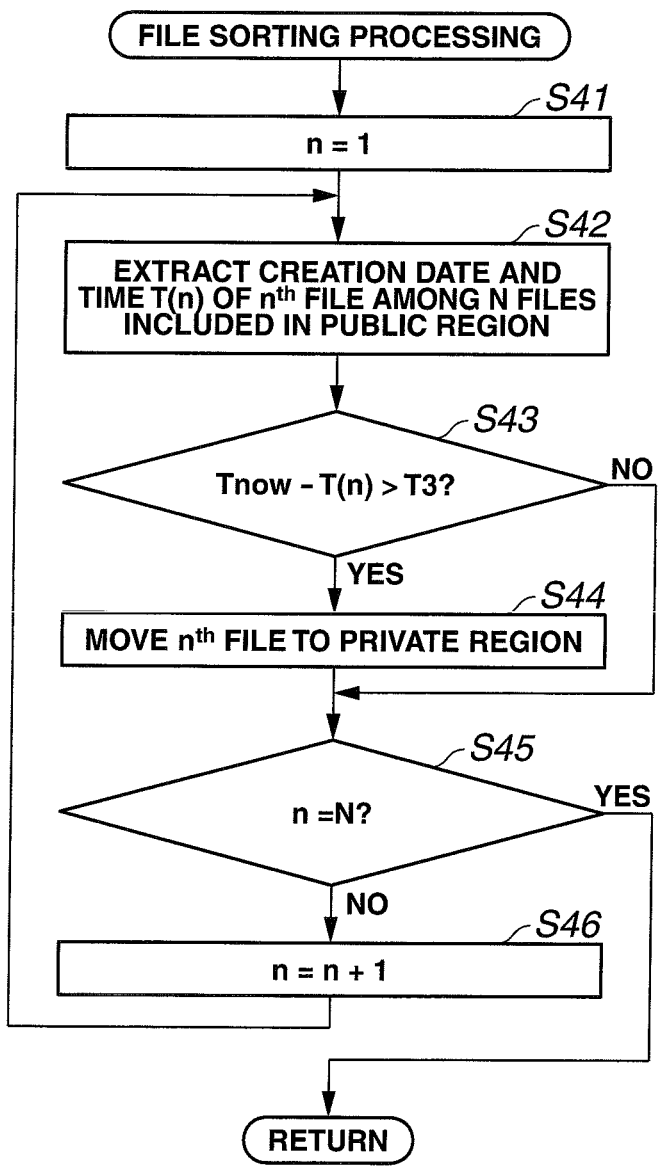
FIG. 9 is a flowchart illustrating operations with respect to file sorting processing.

In step S20, if it is determined that the wireless communication portion 2 is in a stopped state, that is, the wireless network A is in a stopped state, the process transitions to step S40. In step S40, file sorting processing that is illustrated in the flowchart shown in FIG. 9 is executed.

Hereunder, the file sorting processing is described. According to the file sorting processing, first, in step S41, a value of a variable n is set to 1. The variable n is a natural number that is equal to or greater than 1.

Next, in step S42, a creation date and time $T(n)$ of an $n^{th}$ file among files included in the public region RO of the storage apparatus 10 is extracted. Note that it is assumed that the number of all files included in the public region RO when the file sorting processing starts is N.

The value of $T(n)$ may be a value up to units of seconds or may be a value up to units of day. As one example according to the present embodiment, $T(n)$ is in units of day. That is, $T(n)$ is a numerical value that represents the creation date of the $n^{th}$ file.

Next, in step S43, it is determined whether or not a value obtained by subtracting the creation date and time $T(n)$ of the $n^{th}$ file from a current date and time Tnow is greater than a predetermined value T3. In other words, it is determined whether or not the creation date and time $T(n)$ of the $n^{th}$ file is prior to the current date and time Tnow by a time period that is longer than the predetermined time period T3. According to the present embodiment, as one example T3 is 1, and Tnow is a numerical value that represents a date, similarly to $T(n)$. Note that the value of T3 may be a value that can be changed by the user, or may be a fixed value.

If it is determined in step S43 that the value obtained by subtracting the creation date and time $T(n)$ of the $n^{th}$ file from the current date and time Tnow is larger than the predetermined value T3, step S44 is executed. In contrast, if it is determined that the value obtained by subtracting the creation date and time $T(n)$ of the $n^{th}$ file from the current date and time Tnow is less than or equal to the predetermined value T3, step S44 is skipped. That is, according to the present embodiment, if the creation date of the $n^{th}$ file is equal to the current date, the process skips step S44, while in other cases the processing in step S44 is executed.

In step S44, the $n^{th}$ file included in the public region RO is moved to the private region RC.

That is, if the creation date and time $T(n)$ of the $n^{th}$ file indicates that the $n^{th}$ file was created at a date and time that is prior to the current date and time Tnow by a time period that is greater than the predetermined time period T3, the $n^{th}$ file is moved to the private region RC. According to the present embodiment, if the $n^{th}$ file was created on the same day that the instruction to start the wireless network A is inputted, the $n^{th}$ file is left in the public region RO, while if the $n^{th}$ file was created on or prior to the previous day, the $n^{th}$ file is moved to the private region RC.

Subsequently, as shown in step S45 and step S46, the above described process from step S42 to step S44 is performed with respect to all of the N files included in the public region RO.

By performing the file sorting processing as described above, a file that was created at a date and time that is prior to the current date and time Tnow by a time period that is equal to or greater than the predetermined time period T3 is no longer present in the public region RO. After executing the file sorting processing, in step S23, operation of the wireless communication portion 2 is started to start the wireless network A and the wireless network B.

According to the information communication apparatus 1 as described above, when the wireless network A starts, among all the files that are included in the public region RO, files that were created at a date and time that is prior to the current date and time Tnow by a time period that is equal to or greater than the time period T3 are automatically moved to the private region RC. In other words, at the time point at which the wireless network A starts, among the files included in the public region RO, files with respect to which the predetermined time period T3 has elapsed since the files were created are automatically moved to the private region RC.

For example, according to the present embodiment, a file created on the same day as the day the wireless network A starts is stored in the public region RO, and a file created on or prior to the previous day is stored in the private region RC. Consequently, even if the user forgets to delete a file from the public region RO, a situation does not arise in which a file that is older than the predetermined time period T3 is made publicly accessible on the wireless network A against the intention of the user.

As described above, it is possible for the information communication apparatus 1 of the present embodiment to prevent a situation arising in which a file is made publicly accessible on a wireless network against the intention of the user. Further, the image pickup apparatus 100 that is equipped with the information communication apparatus 1 also has a similar effect.

Figure 10:
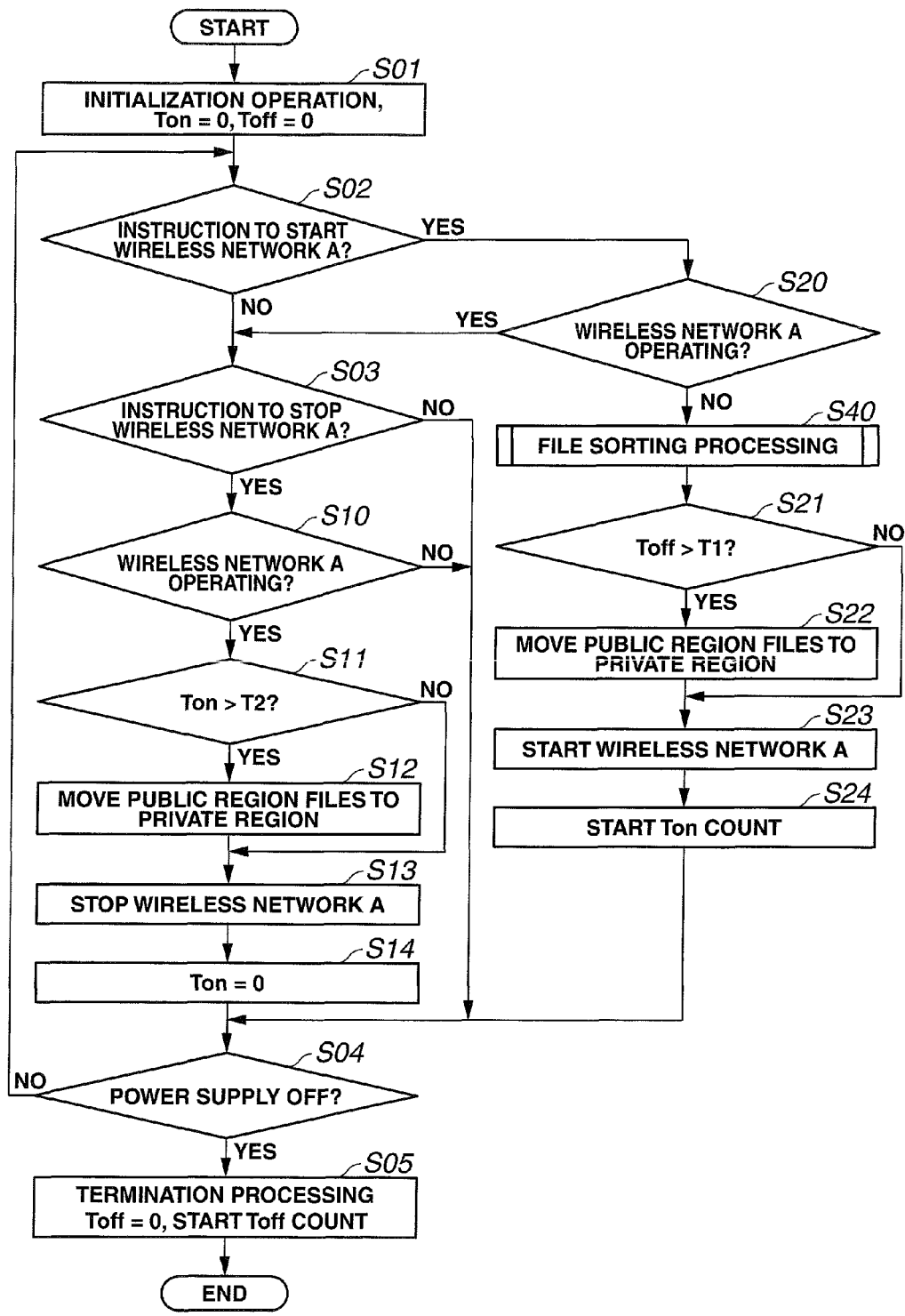
FIG. 10 is a flowchart illustrating a modification of the second embodiment.

Note that, as illustrated as a modification in FIG. 10, the file sorting processing in step S40 of the present embodiment can also be applied to the information communication apparatus 1 and the image pickup apparatus 100 of the first embodiment.

(Third Embodiment)

Next, a third embodiment of the present invention will be described. Note that only differences with respect to the first embodiment and second embodiment are described hereunder, and components that are the same as in the first embodiment and second embodiment are denoted by the same reference numerals and a description of such components is omitted as appropriate.

According to the information communication apparatus 1 of the present embodiment, an instruction to start operation of the wireless communication portion 2 and an instruction to stop operation thereof that are used in the determination in step S02 and step S03 are automatically generated in accordance with predetermined conditions.

Specifically, the control portion 4 generates an instruction to start operation of the wireless communication portion 2 in a case where a file is included in the public region RO of the storage apparatus 10, and generates an instruction to stop operation of the wireless communication portion 2 in a case where a file is not included in the public region RO of the storage apparatus 10.

By adopting a configuration that automatically switches between operation and non-operation of the wireless communication portion 2 in accordance with the existence or non-existence of a file in the public region RO of the storage apparatus 10 in this manner, a state can be avoided in which the wireless communication portion 2 is operating even though a file is not stored in the public region RO, and thus electricity consumption can be suppressed.

Note that a form may also be adopted in which switching between operation and non-operation of the wireless communication portion 2 is performed in accordance with an instruction to start operation of the wireless communication portion 2 and an instruction to stop operation thereof that are inputted by the user through the operation portion 7.

Operations in a case where the above described information communication apparatus 1 of the present embodiment is applied to the image pickup apparatus 100 will now be described. First, operations in an image pickup operation mode of the image pickup apparatus 100 are described using the flowchart illustrated in FIG. 11.

Figure 11:
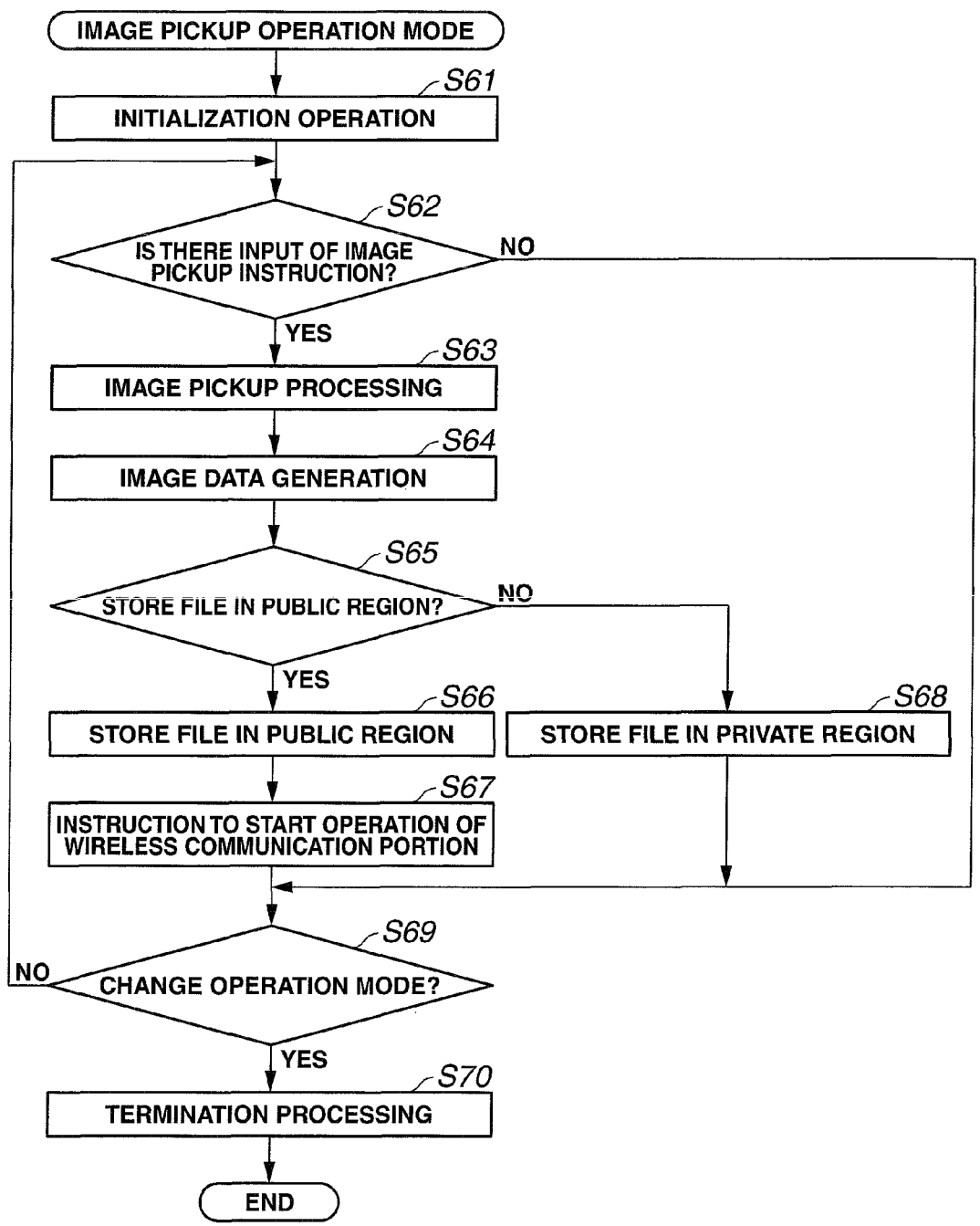
FIG. 11 is a flowchart illustrating operations in an image pickup operation mode of an image pickup apparatus according to a third embodiment.

The flowchart in FIG. 11 is executed in a case where the image pickup operation mode is selected among a plurality of operation modes of the image pickup apparatus 100. Note that the plurality of operation modes of the image pickup apparatus 100 are the image pickup operation mode for picking up an image using the image pickup portion 11, and a playback mode for playing back a file of an image or the like that is stored in the storage apparatus 10.

In the image pickup operation mode, first, in step S61, an initialization operation of the image pickup portion 11 is executed to enter a state in which an image pickup operation can be performed by the image pickup portion 11.

Next, in step S62, it is determined whether or not an image pickup instruction was inputted. An image pickup instruction is inputted, for example, by the user operating the release switch of the operation portion 7. Note that the control portion 4, for example, may also be configured to be capable of executing so-called "interval photographing" in which the control portion 4 automatically generates an image pickup instruction at predetermined time intervals, or for example, may be configured to automatically generate an image pickup instruction in a case where a predetermined pattern such as a face of a person or an animal is recognized in the field of view.

In step S62, if it is determined that an image pickup instruction has not been inputted, the process transitions to step S69. In step S69, it is determined whether or not an instruction to change the operation mode of the image pickup apparatus 100 was inputted. Note that it is assumed that the term "instruction to change the operation mode" also includes an instruction to turn off the power supply of the image pickup apparatus 100.

In step S69, if it is determined that an instruction to change the operation mode of the image pickup apparatus 100 was not inputted, the process returns to step S62. That is, in the image pickup operation mode, as shown in step S62 and step S69, the control portion 4 stands by until an image pickup instruction or an instruction to change the operation mode is inputted.

In step S69, if it is determined that an instruction to change the operation mode was inputted, the process transitions to step S70 to execute termination processing that stops the operation of the image pickup portion 11.

If it is determined in step S62 that an image pickup instruction was inputted, in step S63 and step S64, image pickup processing and image data generation processing are executed that generate image data based on the output from the image sensor. The image data is temporarily stored in a storage apparatus (RAM) of the control portion 4. Note that although an autofocus operation, an exposure determination operation, an image processing operation and the like are included in the aforementioned processing, a description of these operations is omitted herein since techniques for performing these operations are known.

Next, in step S65, when storing an image file in the storage apparatus 10, processing is performed to check which storage region is set as the region in which to store the image file.

Thus, it is determined whether or not the region in which to store the image file is the public region RO.

If it is determined in step S65 that the region in which to store the image file is the public region RO, the process transitions to step S66. In step S66, the file of the image that was picked up is stored in the public region RO of the storage apparatus 10. Next, the process transitions to step S67, in which the control portion 4 generates an instruction to start operation of the wireless communication portion 2. The process then transitions to the above described step S69.

Thus, according to the present embodiment, in the photographing operation mode, in a case where a file of a picked-up image is stored in the public region RO of the storage apparatus 10, operation of the wireless communication portion 2 is started to make the image file publicly accessible on the wireless network A.

In contrast, if it is determined in step S65 that the region in which the image file is to be stored is not the public region RO, the process transitions to step S68. In step S68, the image file is stored in the private region RC. The process then transitions to the above described step S69.

Figure 12:
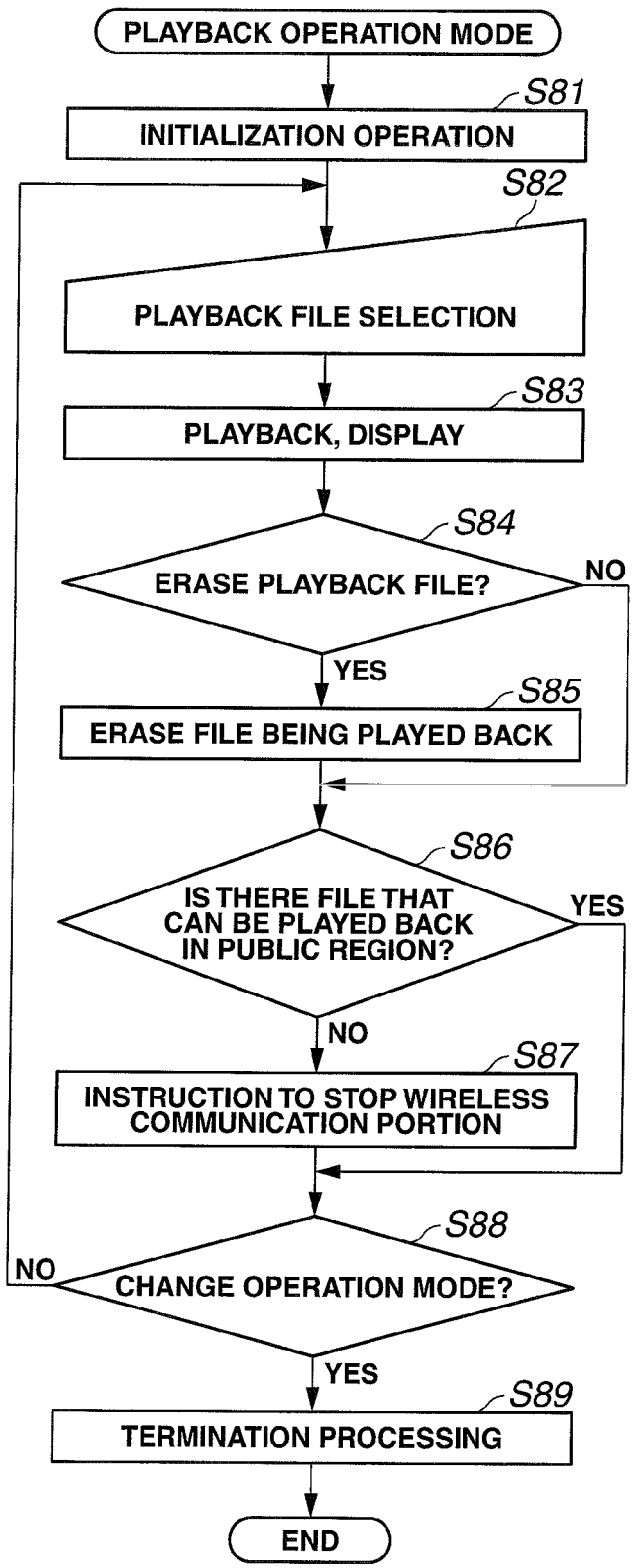
FIG. 12 is a flowchart illustrating operations in a playback operation mode of the image pickup apparatus according to the third embodiment.

Next, operations in the playback operation mode of the image pickup apparatus 100 will be described using the flowchart illustrated in FIG. 12. The flowchart illustrated in FIG. 12 is executed in a case where the playback operation mode is selected among the plurality of operation modes of the image pickup apparatus 100.

In the playback operation mode, first, in step S81, an initialization operation is executed to enter a state in which playback and display operations are enabled at the display portion 13.

Next, in step S82, the control portion 4 waits for the user to input an instruction to select a file to be played back. If the user inputs an instruction to select a file to be played back, the process transitions to step S83. In step S83, the selected file is played back and displayed on the display portion 13.

Next, in step S84, it is determined whether or not an instruction was inputted to erase the file that is being played back from the storage apparatus 10. If an instruction to erase the file that is being played back from the storage apparatus 10 was inputted, in step S85, the relevant file is erased from the storage apparatus 10. If an instruction to erase the file that is being played back from the storage apparatus 10 has not been inputted, the process skips step S85.

Next, in step S86, it is determined whether or not a file that can be played back by the image pickup apparatus 100 is present in the public region RO of the storage apparatus 10. In this case, the term "file that can be played back by the image pickup apparatus 100" may refer only to a file of an image that was picked up by the image pickup apparatus 100, or may include files such as image files and audio files generated by another device as well as a file of an image that was picked up by the image pickup apparatus 100.

If it is determined in step S86 that a file that can be played back by the image pickup apparatus 100 is not present in the public region RO of the storage apparatus 10, the process transitions to step S87. In step S87, an instruction to stop the wireless communication portion 2 is generated. Therefore, according to the present embodiment, in a case where a file that can be played back is not stored in the public region RO of the storage apparatus 10, the wireless communication portion 2 enters a stopped state.

In contrast, in step S86, if it is determined that a file that can be played back by the image pickup apparatus 100 is present in the public region RO of the storage apparatus 10, the process skips step S87.

In step S88, it is determined whether or not an instruction to change the operation mode of the image pickup apparatus 100 was inputted. If it is determined in step S88 that an instruction to change the operation mode of the image pickup apparatus 100 has not been inputted, the process returns to step S82. On the other hand, it is determined in step S88 that an instruction to change the operation mode of the image pickup apparatus 100 was inputted, the process transitions to step S89. In step S89, processing that terminates the playback operation mode is executed.

In a case where an image file is stored in the public region RO of the storage apparatus 10 at the time of an image pickup operation, the image pickup apparatus 100 that is equipped with the information communication apparatus 1 of the present embodiment that is described above starts operation of the wireless communication portion 2 and automatically makes the image file publically accessible on the wireless network A. That is, according to the present embodiment, convenience is improved since it is not necessary for the user to manually input an instruction to start operation of the wireless communication portion 2 to make a file of a picked-up image publicly accessible on the wireless network A.

Further, in a case where a file that can be played back is not stored in the public region RO of the storage apparatus 10, the image pickup apparatus 100 that is equipped with the information communication apparatus 1 of the present embodiment stops operation of the wireless communication portion 2. Consequently, it is possible to prevent a situation arising in which the wireless communication portion 2 continues to operate even though a file that is to be made publicly accessible is not stored in the public region RO, and thus consumption of electric power can be suppressed.

Note that the present invention is not limited to the above described embodiments, and may be suitably changed without departing from the spirit or concept of the invention readable from the appended claims and the entire specification, and an information communication apparatus with such changes is also included in the technical scope of the present invention.

For example, although in the foregoing first to third embodiments a wireless LAN is used as communication means for communication between the information communication apparatus 1 and the external devices 200 and 201, a form may also be adopted in which a wired LAN or a WAN (wide area network) is used as a part or all of the communication means for communication between the information communication apparatus 1 and the external devices 200 and 201.

Further, although in the foregoing first to third embodiments an infrastructure mode is used for the wireless LAN connections between the information communication apparatus 1 and the external devices 200 and 201, such connections may also be made using an ad-hoc mode.

The information communication apparatus according to the present invention is not limited to the form of an image pickup apparatus that is described in the foregoing embodiments, and is applicable, for example, to various electronic devices equipped with a wireless communication function. A flash memory card, a portable storage, a portable communication terminal, a sound recording device, a game machine, and a digital media player may be mentioned as examples of an electronic device that is equipped with a wireless communication function.

What is claimed is:

1. An information communication apparatus, comprising:
a communication portion that is capable of communicating with one or a plurality of external devices through one or a plurality of network lines, and is configured to assign different identification information to each of the one or a plurality of network lines;
a storage apparatus connection portion that performs input and output operations with respect to one or a plurality of storage apparatuses that are configured to be capable of storing an electronic file;
a storage region management portion that is configured to provide, in the storage apparatus, a public region that makes an electronic file publicly accessible with respect to a network line to which predetermined identification information is assigned among the one or a plurality of network lines, and a private region that does not make an electronic file publicly accessible with respect to the network line to which the predetermined identification information is assigned; and
a file management portion that is capable of moving an electronic file that is stored in the storage apparatus, and is configured to move a predetermined electronic file to the private region,
wherein the file management portion is configured to move the predetermined electronic file that is inside the public region to the private region in at least any one of:
a case where a predetermined time period elapses since a previous time the network line to which the predetermined identification information is assigned that makes the predetermined electronic file publicly accessible is stopped;
a case where an operating time period of the network line to which the predetermined identification information is assigned that makes the predetermined electronic file publicly accessible exceeds a predetermined time period; and
a case where an elapsed time period since a time that the predetermined electronic file is created exceeds a predetermined time period.

2. The information communication apparatus according to claim 1, wherein the file management portion is configured to move the predetermined electronic file that is inside the public region to the private region in at least at any one of:
a time of starting the network line to which the predetermined identification information is assigned; and
a time of stopping the network line to which the predetermined identification information is assigned after starting the network line.

3. The information communication apparatus according to claim 1, wherein the communication portion is configured to stop operation in a case where an electronic file is not included in the public region.

4. The information communication apparatus according to claim 1, wherein the communication portion is configured to start operation in a case where an electronic file is newly added to the public region that is in a state in which an electronic file is not included therein.

5. The information communication apparatus according to claim 1, further comprising an external apparatus interface to which an image pickup portion that is configured to be capable of picking up an image is connectable, and which is configured to be capable of storing a file of an image that is picked up by the image pickup portion in a storage apparatus.

6. The information communication apparatus according to claim 5 wherein the predetermined electronic file is an image file that was generated by the image pickup portion.

7. The information communication apparatus according to claim 1 wherein the predetermined electronic file includes user generated content.

* * * * *